(12) United States Patent
McKeown et al.

(10) Patent No.: US 9,296,488 B2
(45) Date of Patent: Mar. 29, 2016

(54) AIRCRAFT BRAKING EARLY WARNING SYSTEM

(71) Applicant: 3rd Millennium Solutions, Inc., Campbellford (CA)

(72) Inventors: Stephen Lyle McKeown, Kingston (CA); Peter Paul Kleinschmidt, Belleville (CA); Jeffrey Alan Laidman, Barrie (CA)

(73) Assignee: 3RD MILLENNIUM SOLUTIONS, INC., Campbellford (CA)

( * ) Notice: Subject to any disclaimer, the term of this patent is extended or adjusted under 35 U.S.C. 154(b) by 0 days.

(21) Appl. No.: 14/196,039

(22) Filed: Mar. 4, 2014

(65) Prior Publication Data

US 2014/0257603 A1    Sep. 11, 2014

Related U.S. Application Data

(60) Provisional application No. 61/773,533, filed on Mar. 6, 2013.

(51) Int. Cl.

| G06F 19/00 | (2011.01) |
|---|---|
| G06G 7/76 | (2006.01) |
| B64D 45/00 | (2006.01) |
| B64C 25/42 | (2006.01) |
| B60T 8/17 | (2006.01) |

(52) U.S. Cl.
CPC ............... B64D 45/00 (2013.01); B60T 8/1703 (2013.01); B64C 25/426 (2013.01); *B60T 2210/36* (2013.01)

(58) Field of Classification Search
CPC ...... B64D 45/00; B60T 8/1703; B64C 25/426

USPC .......................................................... 701/16
See application file for complete search history.

(56) References Cited

U.S. PATENT DOCUMENTS

| 5,968,106 A | 10/1999 | DeVlieg et al. |
|---|---|---|
| 6,130,608 A | 10/2000 | McKeown et al. |
| 6,725,135 B2 | 4/2004 | McKeown et al. |
| 6,934,611 B2 | 8/2005 | McKeown et al. |
| 6,987,451 B2 | 1/2006 | McKeown et al. |
| 7,201,133 B2 | 4/2007 | McKeown |

(Continued)

OTHER PUBLICATIONS

International Search Report of PCT Application No. PCT/IB2014/059470; Dated Jul. 15, 2014.

(Continued)

*Primary Examiner* — Maceeh Anwari
(74) *Attorney, Agent, or Firm* — Pearne & Gordon LLP

(57) ABSTRACT

A method provides alert information, regarding an aircraft wheel braking system, to an operator of an aircraft during an aircraft landing. An input of a target deceleration rate for the landing aircraft is received prior to the aircraft having landed on a ground surface. At least one sensor electronically collects information relevant to a real-time deceleration rate of the aircraft after the aircraft has landed on the ground surface, and the real-time deceleration rate of the aircraft is calculated. The target deceleration rate is compared to the calculated deceleration rate to determine an effectiveness of the aircraft wheel braking system. A visual, audible, or tactile alert is optionally provided to the operator of the aircraft, and data from this system could also be used as an input for various other aircraft safety systems. A system for performing the method is also provided.

23 Claims, 1 Drawing Sheet

(56) References Cited

U.S. PATENT DOCUMENTS

| | | |
|---|---|---|
| 7,617,721 B2 | 11/2009 | McKeown et al. |
| 7,766,431 B2 | 8/2010 | Griffith et al. |
| 8,060,261 B2 | 11/2011 | Goodman et al. |
| 8,224,507 B2 | 7/2012 | Edwards et al. |
| 8,494,692 B2 | 7/2013 | Valentova et al. |
| 2001/0052562 A1 | 12/2001 | Ishihara et al. |
| 2006/0243857 A1 | 11/2006 | Rado |
| 2008/0162092 A1 | 7/2008 | Coulmeau et al. |
| 2009/0048724 A1 | 2/2009 | Caule |
| 2011/0166723 A1 | 7/2011 | Valentova et al. |
| 2012/0262306 A1 | 10/2012 | Edwards et al. |

OTHER PUBLICATIONS

Levin, Alan; "Chicago runway too slick at crash"; USA Today; Mar. 2, 2006; http://usatoday30.usatoday.com/news/nation/2006-03-01-slick-runway_x.htm.

Jenkins, Marisa; "Reducing Runway Landing Overruns"; Aero Quarterly; Jul. 24, 2012; pp. 15-19.

Nelson, Harry; "Runway Overrun Prevention System"; ECAST Meeting; Mar. 6, 2013.

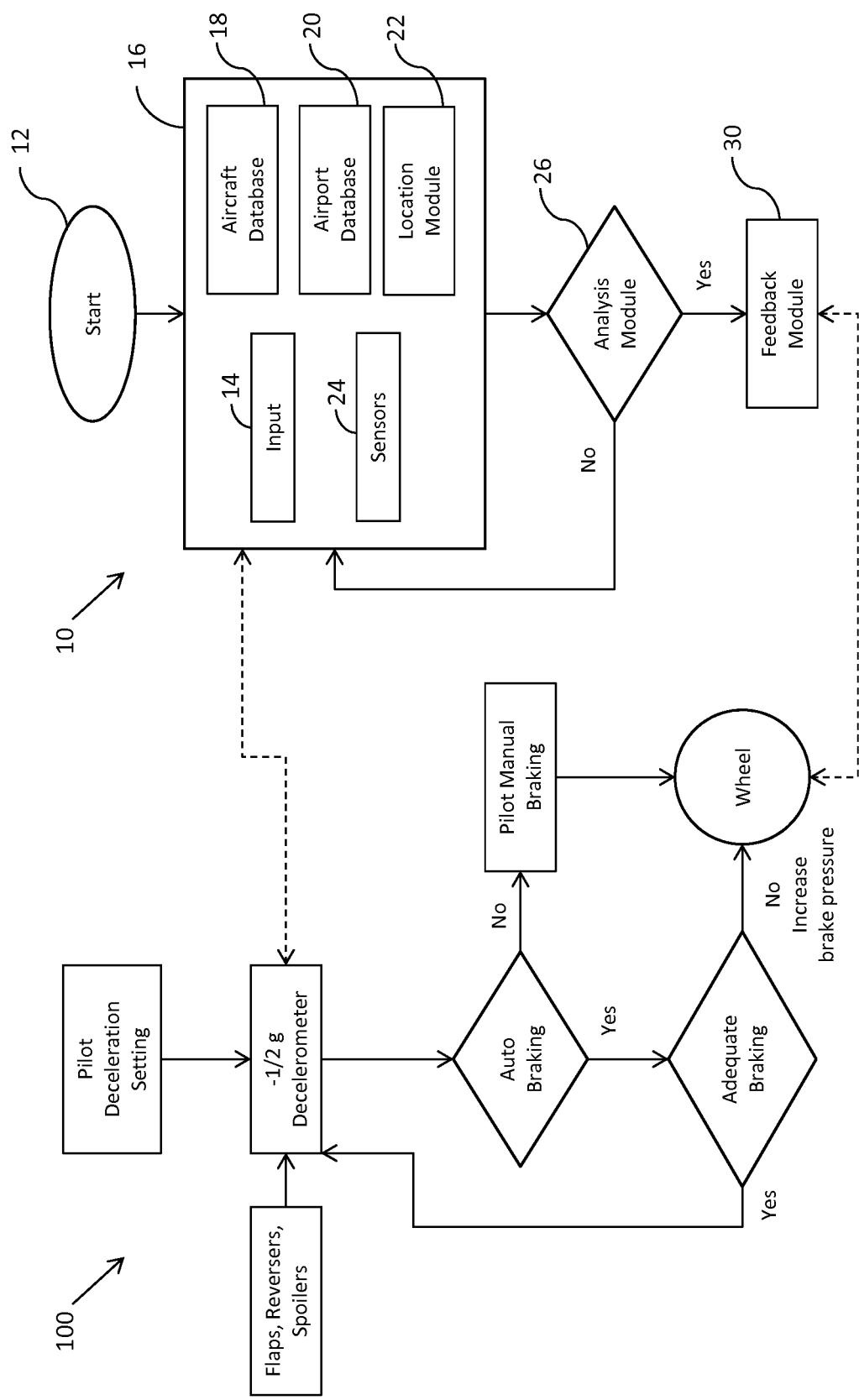

AIRCRAFT BRAKING EARLY WARNING SYSTEM

CROSS-REFERENCE TO RELATED APPLICATIONS

This application claims the benefit of U.S. Provisional Application No. 61/773,533, filed Mar. 6, 2013, the entire disclosure of which is hereby incorporated herein by reference.

FIELD OF THE INVENTION

The present invention relates generally to methods and apparatus for determining a predicted vehicle braking operation, and providing real-time feedback to the vehicle operator.

BACKGROUND OF THE INVENTION

Aviation is an inherently risky mode of travel in bad weather. Unlike other modes of transportation such as by land or sea where dangerous weather conditions can be avoided by "waiting out the storm", an aircraft carries a finite amount of fuel to power its engines, and must land at a suitable airport before it runs out of fuel. In addition, the great distances that an aircraft can travel in a relatively short period of time allow for drastically different landing conditions from takeoff to landing. In today's society where time is a valuable asset, pilots often feel pressured to land their aircraft in weather conditions they might otherwise wish to avoid. In order to remain safe, pilots must be provided with very accurate information regarding real-time aircraft performance during landing in those conditions.

Most pilots currently rely partly on information provided by another pilot who has recently landed for a description of the runway conditions. A contaminated runway may present hazardous conditions for landing aircraft because the effectiveness of wheel brakes may be reduced or negated by a low coefficient of friction (resulting from the ground contamination) between the runway surface and the wheels of the landing aircraft. Even so, individual pilot experiences are different and reports of this kind are very subjective. For a pilot who regularly lands in winter conditions, a little snow on the runway may be perceived and reported as good landing conditions, whereas a pilot who has mostly or always landed on non-snow covered, or otherwise contaminated runways may think that the same runway is in poor condition. The subjective nature of these observations limits their usefulness.

Another technique to provide pilots with runway characteristics is the use of a ground vehicle with a friction measurement device. Several of these devices have been conceived using different techniques to measure the current frictional characteristics. Many of these devices (for example U.S. Pat. No. 4,144,748) use a fixed slip ratio between the rotational speed of the measurement wheels and ground speed. This fixed slip produces a force proportional to the frictional characteristics of the surface being driven upon, and can give an indication of the condition of the runway. This measurement is difficult to interpret by an airplane pilot flying an aircraft with a varying and modulating slip ratio as in an aircraft anti-skid braking system (ASBS), and thus has limited applicability to assist the pilot in safely landing their aircraft.

Other devices such as U.S. Pat. Nos. 4,958,512, 5,814,718 and 6,711,935 use variable braking of the measurement wheel in an attempt to locate the peak frictional coefficient for the current runway conditions. In U.S. Pat. No. 4,958,512, the frictional measurement device can be set up to "seek out" the slip factor which will provide the maximal runway friction, and measure the magnitude of that force. Alternately, this invention can be set up to measure the friction at a given fixed slip ratio anywhere from 0 to 100% slip. While this would be beneficial to a braking system which incorporated this idea, it is of limited use to current aircraft braking systems as they do not have the capabilities to 'seek out' and then maintain the maximum runway friction wheel slip ratio.

Finally, a device such as U.S. Pat. No. 7,617,721 can be used that more accurately mimics the stopping characteristics of an aircraft, so that more accurate calculations of stopping distances can be made by a pilot landing or taking off on a runway covered in snow, ice, or some other contaminant. With this device, a pilot will have a reasonable idea of how their aircraft will stop on that runway. However, all of the foregoing techniques rely upon ground crew to take active measurement steps before landing to analyze and approximate the conditions on each runway at the airport. Thus, it would be beneficial to provide instantaneous and dynamic information in real-time to the pilot of an actual aircraft that is performing a landing procedure.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a method of providing alert information, regarding an aircraft wheel braking system, to an operator of an aircraft during an aircraft landing. The method comprises the step of receiving an input of a target deceleration rate for said landing aircraft, said input being received prior to said aircraft having landed on a ground surface. The method further comprises the steps of electronically collecting, via at least one sensor, information relevant to a real-time deceleration rate of said aircraft after said aircraft has landed on said ground surface, and calculating the real-time deceleration rate of said aircraft. The method further comprises the steps of comparing said target deceleration rate to the calculated deceleration rate to determine an effectiveness of said aircraft wheel braking system, and providing a visual, audible, or tactile alert to the operator of the aircraft if the effectiveness of said aircraft wheel braking system is different than an anticipated amount.

In accordance with another aspect of the present invention, a system provides alert information, regarding an aircraft wheel braking system, to an operator of an aircraft during an aircraft landing. A data collection module is configured to receive an input of a target deceleration rate for said landing aircraft prior to said aircraft having landed on a ground surface, and to electronically collect information relevant to a real-time deceleration rate of said aircraft after said aircraft has landed on said ground surface. An analysis module is in signal communication with the data collection module and is configured to calculate the real-time deceleration rate of said aircraft based upon said collected information, and to compare said target deceleration rate to the calculated deceleration rate to determine an effectiveness of said aircraft wheel braking system. A feedback module is in signal communication with the analysis module and is configured to output a visual, audible, or tactile alert to the operator of the aircraft if the effectiveness of said aircraft wheel braking system is different than an anticipated amount.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 1 illustrates a flow chart of one example operation of the method and apparatus described herein.

DESCRIPTION OF EXAMPLE EMBODIMENTS

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

The present application provides methods and apparatus for determining the instantaneous and dynamic vehicle braking effectiveness of an actual aircraft that is performing a landing procedure, as a result of the actual support surface conditions and other environmental concerns, to permit a vehicle operator (e.g., an aircraft pilot) to better understand how a vehicle wheel braking system is actually performing during a braking operation (e.g., a landing procedure). The methods and apparatus of the instant application are especially useful with slippery, contaminated runways (snow, slush, ice, water etc.), in adverse wind conditions, and/or with poorly or un-deployable non-wheel braking aircraft deceleration systems (e.g., reversers, aerodynamic drag systems, etc.).

The present application can relate to aircraft wherein the braking operation comprises a landing operation, take off operation or an aborted takeoff or landing operation on an airfield runway. It will be appreciated that the concepts of the present invention may be used to determine how other vehicle braking systems will perform during other braking operations. Unlike other devices used to measure the frictional characteristics of a support surface, such as a road surface, runway surface or the like, the present application is less concerned with the measurement of the frictional characteristics of the support surface, and more concerned with measuring the actual, instantaneous deceleration of a vehicle and its braking characteristics, such as a landing aircraft, to provide the vehicle operators (e.g., pilots, vehicle operators) with an instantaneous and dynamic indication of how the vehicle is actually performing during a real-time in situ braking operation.

Aircraft anti-skid braking systems, when used in an "automatic" or "auto-braking" mode by a pilot selecting the same, actually look for a total aircraft braking deceleration value of "X", and only solicit for a wheel braking component of that target braking that "tops up" the aerodynamic drag of the aircraft (including the braking from control surfaces like spoilers and flaps) and the braking given by reverse thrusters. Therefore, at high speeds, where the non-wheel braking deceleration forces like the foregoing are most effective, the wheel braking required to "top up" the other decelerative forces is less than the wheel braking "top up" required to meet target braking as the aircraft slows down and the non-wheel braking forces have diminished effectiveness.

So, after an aircraft has touched-down, pilots can sense that the aircraft is slowing/braking well, but do not have the ability to sense that actual wheel braking may not be very good until they have landed and travelled a significant, and perhaps critically long distance down the runway. At that time in a landing, we understand that it is often not possible to apply power and take off again, and there may not be enough runway and RESA ("Runway End Safety Area") to prevent a dangerous overrun or overshoot of the runway if the lower than known/expected wheel braking is insufficient to prevent this.

Accordingly, the instant application provides technology in the flight deck to give the flight crew the earliest possible warning that the aircraft wheel braking system is not providing enough braking to either supplement the non-wheel braking deceleration systems, and/or is unable to achieve the asked for "target" braking that may have been used in making a "safe land"/"evasive action" decision. In various examples, as described herein, the technology could ask and/or provide for the input of the target braking value, monitor aircraft deceleration, and, when true, provide an audio and/or visual and/or tactile warning to the aircrew that the target braking is not being met. The technology could also offer advice to the air crew on actions they could take, such as increase or extend reverse thrust efforts (e.g., thrust reversal that temporarily diverts an aircraft engine's exhaust so that the exhaust produced is directed forward to provide deceleration, and use of the phrase herein is further intended to include similar methods and effects achievable on prop-driven aircraft), select manual or non-anti-skid braking, or interact with aircraft systems and controls in any way that might safely increase aircraft braking and/or any other type of aircraft control or behavior (example: the pilot elects to exit the runway to the side into deep snow that will help the aircraft decelerate rather than stay in the center of a runway that may not be long enough to allow the aircraft to stop before the end of the runway/RESA/EMAS).

One consideration with aircraft systems is that tapping into an aircraft system can become wrought with challenges and difficulties from aircraft manufacturers, regulators and other aviation stakeholders. Thus, the apparatus and method of the instant application is not intended to modify an aircraft system, but instead to be an independent system (although it could still rely on the aircraft for power supply, or be self-powered by a battery, etc.). However, it is contemplated that the apparatus and method of the instant application could also be partially or entirely integrated into the aircraft system. For example, the apparatus can include one or more internal sensors, although it could also include one or more external sensors that could include sensor inputs from the aircraft's onboard sensor equipment. Additionally, it may be beneficial to mount the apparatus directly to the aircraft so that the sensors more directly sense the actual aircraft performance, instead of possible forces imparted by a user holding the system. When the apparatus is mounted securely to the aircraft and is moveable together with the airframe, forces sensed by the apparatus may be used as a surrogate for forces experienced by the aircraft. Thus, the apparatus can be used with a wide variety of aircraft, including those which may or may not include an on-board electronics package and/or autobrake system The independency of the apparatus can be beneficial to enable the apparatus to be used in a wide variety of aircraft with little regard to the particular capabilities of the aircraft, such as whether the aircraft has a particular electronics package. For example, the apparatus can be used with older aircraft, small recreational aircraft, military aircraft, etc. at the discretion of the pilot. The apparatus can be helpful to recreational pilots flying relatively small aircraft with limited experience landing on a contaminated runway. Additionally, because of the independent nature of the apparatus, it can be used at the discretion of the pilot. For example, during a dry, sunny day with little or no runway contamination, the pilot may utilize personal experience to choose not to use the apparatus. However, the pilot may also choose (or it could be SOP) to utilize the apparatus when landing on a short runway, a wet runway, a contaminated runway, other relatively low friction runway.

Conventionally, basic operation for aircraft "Auto Braking" is for the pilot to determine a setting of the automatic braking system which could also be called a target brake setting. The setting values may vary between aircraft, but are usually 4 different settings (e.g., 4, 8, 12 and 16) with an example max deceleration of "0.5 g or ½ g". Each number has a relationship to a deceleration in ft/s$^2$, or "g". Thus, an example maximum deceleration of 16 ft/s$^2$ (4.9 m/s$^2$) is related to a deceleration of approximately "0.5 g or ½ g" and an example minimum deceleration of 4 ft/s$^2$ (1.2 m/s$^2$) is related to "0.125 g or ⅛ g". Of course, different, more, or less deceleration values may be provided for any particular aircraft. Moreover, the actual setting of the automatic braking system selected by the pilot may use different nomenclature, such as A, B, C, D, etc., although it is understood that each of these settings does correlate to a target deceleration rate for the aircraft. Typically, a pilot will select the safest, lowest target brake setting to increase passenger comfort and to reduce wear on the aircraft systems. An on-board accelerometer located on the aircraft measures the deceleration of the aircraft and adjusts the brake pressure as required. The "Auto Brake" then automatically controls the wheel brake pressure. So, if the aircraft is decelerating from other influences (e.g., reversers, flaps, etc.) the accelerometer will measure this and apply or not apply the brake pressure accordingly. This is a feedback system where brake pressure is adjusted to meet the "target" aircraft deceleration. Even so, the auto-brake system is an internal operation of the aircraft and is "invisible" to the pilot in that it does not provide any alerts or other warnings that the aircraft may not be achieving the desired target braking. Additionally, once the aircraft slows to a specific speed, such as approximately 35 knots), the "Auto Braking" may no longer have influence on braking.

Thus, conventional aircraft "Auto Braking" systems are looking for a "target" deceleration range or max value and will only allow the application of wheel brakes as required to meet the target deceleration. Drag from runway contamination will influence the aircraft braking as this is also a deceleration influence. Additionally, a contaminated runway could result in activation of the aircraft anti-skid braking systems, which would affect braking possibly independent of the deceleration to adjust for wheel "slip." Moreover, other conventional systems rely upon ground crew estimations of the runway conditions, estimated braking performance from an estimated coefficient of friction between the brakes and the wheels and/or the wheels and the runway surface, expected runway landing distances and lengths, estimated braking pressure assumed to be applied to the brakes, etc. In other words, conventional systems are reliant upon theoretical values and assumptions that, especially in the case of runways contaminated by snow or ice, are unlikely to be correct. By using the method and apparatus of the instant application, the actual braking effectiveness of the aircraft is detected in situ on the ground, and the pilot is notified at the earliest possible time that the actual braking effectiveness is different (i.e., relatively less) than expected.

Accordingly, the instant application provides several example objectives including, but not limited to, any or all of the following. In one example, the instant application includes a system for providing alert information, regarding an aircraft braking system, to an operator of an aircraft during an aircraft landing. In practice, the system can inform the flight crew at the earliest time possible that the wheel braking is not supplementing the other aircraft deceleration forces enough to meet "target" braking (thereby raising awareness in the flight deck that wheel braking may be poorer than anticipated). In another example, the instant application can inform the flight crew of ways to enhance aircraft deceleration, such as suggesting that the pilot disable the aircraft anti-skid braking systems, or retain max reverse thrust longer than "normal" or "usual"), and can also inform the flight crew if there is enough runway for landing and stopping through the use of GIS, GPS (Global Positioning System), dead reckoning and/or other situational awareness technologies. In yet another example, the instant application can inform the flight crew of various options for stopping, and/or emergency actions. This could provide information to flight crew for awareness, or initiate the change to "Manual Braking", or Manual Non Anti-Skid Braking from "Auto Braking" if more braking is required than from the other aircraft deceleration influences (assuming that "Manual Braking" or Manual Non Anti-Skid Braking is available on that particular aircraft).

The system can include an independent electronic device that is in physical connection with the aircraft. The independent electronic device may not be in electronic data communication with the aircraft (although it may still receive electrical power from the aircraft). The independent electronic device includes at least one sensor that is capable of sensing and providing information relevant to the real-time deceleration rate of the aircraft that is collected in situ by the independent electronic device. In one example, the independent electronic device (including sensors) can be provided in a single unit, such as a computing device (e.g., a laptop computer, a tablet computer, smartphone, or the like). Electronic flight books are becoming more popular with pilots, and the apparatus may be combined therewith. For example, the apparatus and sensors can be provided by an Apple® iPad® or similar device. The computing device can include numerous built-in sensors, including a three-axis gyro, accelerometer (one, two, or three axis), ambient light sensor, barometer, altimeter, etc. The computing device can also include various geographical location sensor(s) and techniques for sensing location, including a digital compass, independent or assisted GPS, GIS, and GLONASS receivers, and may also use cellular and Wi-Fi based techniques. It is contemplated that the computing device could also include various other built-in or connectable sensors, such as sensors for acceleration, temperature, barometric pressure, humidity, altitude, etc. In addition or alternatively, it is contemplated that the computer, tablet-computer, or smartphone could be configured to obtain sensed data from one or more remote sensors, coupled via wired or wireless systems. Such remote sensors could be specific to the computer, tablet-computer, or smartphone, or could even be a part of the aircraft.

Further, the computing device includes a microprocessor that is operable to execute computer-readable logic stored in a computer-readable memory device. This computer-executable logic is to be executed by the microprocessor for controlling operation of the computing device. The computer-executable logic can include embedded firmware, for example, or other suitable computer-executable logic stored in the memory device. The steps and functions described as being performed herein by the system 10 can optionally be executed, controlled, initiated or any combination thereof through the microprocessor's execution of the computer-executable instructions stored in the memory device or other suitable computer-readable memory. Preferably, the computer-executable logic utilizes modules including one or more units capable of processing or evaluating signals input into or stored within the system. Each module can be a stand-alone unit or a plurality of units that include hardware, software, or a combination thereof. Additionally, the microprocessor is in signal communication with any of the sensors of the computing device.

Additionally, the computing device includes an input device configured to receive input from the operator of the aircraft, and an output device configured to output the visual, audible, or tactile alert to the operator of the aircraft. For example, the computing device can provide an easy-to-use touchscreen device, although external keyboards or other input devices could be utilized as well. The touchscreen device can include both a visual display device and a touch-sensitive input device, such that the touchscreen device comprises both of the input device and the output device. In addition, the computer, tablet-computer, or smartphone can also provide the programming, operating system, data logging, data analysis, feedback and user-alerting capabilities described herein in a single device. Thus, as noted herein, a computing device provided as a tablet-computer like the iPad® could function as an independent system apart from the aircraft. Preferably, the computing device is securely mounted to the aircraft.

Each of the sensors is capable of measuring a specific condition related to the operation, configuration or environs of the vehicle. The sensors can include measurement or detection of any or all of: accelerations and decelerations (including lateral, longitudinal and vertical g-forces), GPS-based or other speed, location and heading determinations, runway or road transponder information, steering actuator position, wheel angle positions, load characteristics, brake actuator position, brake fluid pressure, throttle actuator position, engine revolution speed, engine power, engine torque, ground speed, wheels differential speeds, incline, ambient pavement temperature, pavement friction, and vehicle roll rate. Additional sensors that are known in the art for determining a vehicle condition and relevant geographic situational awareness (for example—how far is it to the end of the runway?) can also be used. The term determining as used herein refers to determining, detecting, sensing, measuring, obtaining, acquiring, calculating and the like. Further, "vehicle operating condition" as used herein includes vehicle conditions, environmental conditions affecting vehicle operation, situational awareness and the like. Those vehicle conditions listed herein are intended by way of example only, and other determined conditions can be used without departing from the intended scope of the present invention.

By using an input of one or more of the sensors (or other a vehicle operating condition signal), the system is capable of deducing when a potentially unsafe aircraft landing condition may be present and warning the flight crew. A basic dynamic model of an aircraft from either analysis or experiment could be programmed into the processor to serve as an initial model. The processor could then use the basic model to deduce an aircraft specific model and then store it as the initial model in the database for this specific aircraft. The processor uses knowledge-based algorithms including, but not limited to, rule-based algorithms, neural network techniques, programmed set-limits and digital signal processing to determine the present aircraft condition in real time and predict the possible vehicle behavior in the immediate future based on present operating conditions.

One or more operator feedback apparatuses are connected to the processor. When the processor determines that an unsafe landing condition may be present or is likely to occur, it sends a control signal to activate one or more of these feedback apparatuses. The feedback apparatuses include various types of visual, audible, and tactile alerts, such as alarms, displays, buzzers, vibrators, or flashing lights. In another example, the feedback apparatuses could display simplified alert indicators, such as a system similar to the "stoplight" used on Navy aircraft carriers that tell a pilot via a red (do not proceed), yellow (caution), or green light (proceed) whether the current aircraft landing is advisable based on the instant performance information. In another example, the feedback apparatuses could display a detailed analysis of the braking operation from which the pilot could make decisions.

One example method of using the system and apparatus will now be described with respect to an aircraft braking operation although other vehicle braking operations are possible for other types of vehicles. Aircraft braking operations can include, for example, an aircraft landing operation, a takeoff operation, an aborted takeoff or landing operation, or the like. A vehicle condition operator feedback processor, controller or other control system receives a plurality of signals from a vehicle operating condition determining system or apparatus which comprises various sensors. The sensors could be mounted to the vehicle directly or indirectly. For example, some or all of the sensors could be part of the operator feedback processor, controller or other control system, which in turn could be secured to the vehicle (or even possibly held by a user within the vehicle). As described above, it may be beneficial to mount the system directly to the aircraft so that the sensors more directly sense the actual aircraft performance, instead of possible forces imparted by a user holding the system.

Turning to the shown example of FIG. 1, a flow chart illustrates one example operation of the method and apparatus described herein. The flow chart illustrates, on the left-hand column, conventional aircraft operations and performance 100, while on the right-hand column, one example method of providing alert information, regarding an aircraft wheel braking system, to an operator of an aircraft during an aircraft landing. One example operation of the real-time alert system 10 is described herein. The flow chart is intended to illustrate one example of how the real-time alert system 10 operates relative to, and complementary with, the actual aircraft systems.

The system 10 starts 12 with the step of receiving an input 14 of a target deceleration rate for the landing aircraft. The system 10 can utilize a data collection module 16 that is configured to receive at least the input 14 of the target deceleration rate, as well as other automatic, semi-automatic, or manual input information. The input is received prior to the aircraft having landed on a ground surface (i.e., in preparation for landing while the aircraft is airborne). The input may be received via the input mechanism of the computing device, such as the touchscreen. To prepare for an aircraft landing, the pilot selects a landing deceleration setting (as described above) for the aircraft and inputs this information into the aircraft systems. The system 10 can receive this input 14 of an automatic braking system (ABS) setting. If the input 14 is an actual target deceleration rate (i.e., in ft/s$^2$ or m/s$^2$), then the system 10 can utilize this information directly. However, if the input 14 utilizes other nomenclature (i.e., A, B, C, etc.), then the system 10 can determine the target deceleration rate for the aircraft by correlating the input 14 automatic braking system (ABS) setting with a predetermined deceleration rate for the aircraft. Moreover, if the aircraft does not include an automatic braking system, then the pilot may directly enter a desired target deceleration rate (i.e., in ft/s$^2$ or m/s$^2$) that the pilot is attempting to achieve during landing.

The data collection module 16 may receive additional input information. If desired or necessary, the pilot or aircrew may also input settings for the flaps and/or reversers. The pilot or aircrew could also optionally input additional information, such as the aircraft type, weight, center of gravity, flap/slat settings, landing gear configuration, braking settings (anti-skid settings, manual braking, braking pressure, etc.), amount of people and/or cargo on board, landing conditions (dry, wet, ice/snow, wind speed and direction, etc.), airport information, and/or actual landing runway. Preferably, some or all of this information is pre-programmed or defined prior to the landing sequence. For example, the aircraft information may be pre-programmed and automatically selected from an aircraft database module 18. Similarly, the airport and/or actual landing runway can be pre-programmed and automatically selected from an airport database module 20, or may even be automatically or semi-automatically determined based upon the sensed location of the aircraft based upon GPS, GIS, GLONASS, etc. (which may utilize a location database module 22). Still, some or all of this information could be automatically provided, and/or preset. In one example, the system could interpret this information from the date (summer, winter, etc.) and the aircraft location via GPS. In still another example, the system could be pre-programmed with various airport information, including actual runway information (such as runway length, safe landing distances, etc.) so that the processor could automatically determine the location of the aircraft, based on the GPS or other geographical location sensor. For example, based on the GPS location and heading of the aircraft, the system 10 could determine exactly which runway will be used, and the geographical specifications of that actual runway. Additionally, the system 10 can utilize the various onboard sensors of the independent electronic device (or even connected sensors of the aircraft) to determine the real-time aircraft heading, speed, and deceleration. The deceleration can be measured in any desired units, such as feet per second per second or meters per second per second. Further, the system can initialize or calibrate itself and the sensors either prior to the flight, or upon activation of the landing procedure to account for or normalize the readings to the actual location, altitude, heading, speed, acceleration, environmental conditions, etc. of the actual landing zone. The processor can utilize this calibration to adjust its calculations based on absolute or relative values.

During the landing procedure, the system 10 measures the real-time aircraft deceleration performance of the aircraft. The system 10 can electronically collect, via at least one sensor 24, information relevant to a real-time deceleration rate of the aircraft after the aircraft has landed on the ground surface. The data collection module 16 is further configured to electronically collect this information relevant to a real-time deceleration rate of the aircraft. The information relevant to a real-time deceleration rate of the aircraft can include, but is not limited to, the real-time aircraft heading, speed, and instantaneous deceleration, which can be determined directly or indirectly using one or more sensors, such as accelerations and decelerations (including lateral, longitudinal and vertical g-forces), GPS-based speed, or other speed, location and heading determinations. It is understood that the ground surface can be any surface onto which the aircraft lands, such as a conventional runway.

Because the system 10 is intended for use when the aircraft has actually landed on the ground surface, the system 10 may delay collecting deceleration information until the aircraft has touched-down. For example, the system 10 may utilize one or more sensors to determine when the aircraft has first landed on the ground surface, and automatically inhibit the electronic collection of information relevant to the real-time deceleration rate of the aircraft until it is determined that the aircraft has first landed on the ground surface. In various examples, the system 10 may utilize an altimeter or GPS (either of which may cross-reference the airport database module 20 and/or location database module 22), or an accelerometer that can sense the wheel touchdown upon the runway, or even a manual input from the pilot or flight crew.

Next, the system 10 performs an analysis based upon the real-world braking performance as compared to the expected braking performance. Thus, the system 10 calculates the real-time deceleration rate of the aircraft, and compares the previously-input target deceleration rate to the real-time calculated deceleration rate to thereby determine an effectiveness of the aircraft braking system. The real-time deceleration rate of the aircraft includes a composite value that includes the deceleration rates attributable to at least two of aerodynamic drag of the aircraft, thrust reversal of the aircraft, and wheel braking of the aircraft, and may include other contributing deceleration rates. In other words, despite the theoretical expected braking performance of the aircraft, the system 10 determines the actual, on-the-ground composite deceleration of the aircraft in order to understand if the aircraft is actually slowing at the desired rate. In so doing, the system 10 can very quickly understand if the aircraft is slowing as expected, or if runway conditions via contamination or weather are causing the aircraft to slow at a reduced and unacceptable rate.

The system 10 may utilize an analysis module 26, in signal communication with the data collection module 16, to calculate the real-time deceleration rate of the aircraft based upon the collected information from the one or more sensors and/or databases. The analysis module 26 further compares the input target deceleration rate to the calculated deceleration rate to determine the effectiveness of the aircraft braking system. The actual, in situ effectiveness of the aircraft braking system during the aircraft landing may be quantified in various ways. In one example, the analysis module 26 can calculate a difference between the target deceleration rate and the actual deceleration rate of the aircraft, and the difference may be used to determine future action. The difference may also be compared against an anticipated amount which was predetermined based upon previous information, such as aircraft testing, simulations, extrapolations, etc. In some examples, the anticipated amount can be one of a percentage and a range of the target deceleration rate. For example, the anticipated amount can be useful to quantify a variance between the target deceleration rate and the actual deceleration rate of the aircraft, such as in terms of an increasing severity of the variance. This can be useful information when deciding what, if any, alerts or suggested corrective actions to provide the pilot. In one example, the system 10 can trigger an alert when the difference includes a range of differences or a percentage between the predicted and actual decelerations. If the pilot had commanded maximum auto-brake, but the actual effective deceleration was different than the predicted braking performance by an amount that exceeds a predetermined percentage or falls outside of a predetermined range (such as when a contaminated runway greatly reduces the coefficient of friction between the wheels and the ground surface), a signal can be triggered to indicate that the actual aircraft braking system requires further attention.

Finally, the system 10 may present feedback to the pilot of the aircraft. The example, the system 10 can provide a visual, audible, or tactile alert to the operator of the aircraft if the effectiveness of the aircraft braking system is different than an anticipated amount. A feedback module 30, in signal communication with the analysis module 26, can be configured to output the visual, audible, or tactile alert. The feedback may be realized via the output mechanism of the computing device, such as the touchscreen or a loudspeaker. If the chosen deceleration braking setting appears to be sufficient, when compared to the actual deceleration of the aircraft, then the system will benignly indicate that the landing conditions are favorable. The system may offer no output, or may provide a visual or audible confirmation, such as a green indicator. However, if the chosen deceleration braking setting is insufficient, when compared to the actual deceleration measured in real-time by the aircraft to decelerate to a stop safely on a designated runway, an alert can be triggered for a pilot of the actual aircraft in response to the difference between the actual deceleration required and the targeted braking force. This alert may include an indication that the calculated real-time deceleration rate of the aircraft is less than the target deceleration rate for the landing aircraft. Various types of audible, visual, or tactile alarms can be used. In one example, the alarms can immediately indicate to the pilot, in simplified or detailed visual, audible or tactile variations, that the chosen deceleration braking setting is insufficient for the actual runway being used. For example, a red indicator (flashing or static) and/or an audible alarm (sound or spoken warning) can be used. In addition or alternatively, the feedback module 30 could send feedback data from this system (in any suitable format, including analog and digital data) to be used as an input for various other on-board aircraft safety systems. The on-board aircraft safety systems can use the feedback information to provide additional feedback to the pilot using existing on-board aircraft elements and/or which may utilize the data to affect automatic or semi-automatic operation of the aircraft (including deceleration systems or various other systems) while landing.

The feedback module 30 may also suggest alternative actions that the pilot can take, such as flap settings, reversers, manual increased braking, disabling the anti-skid braking system, or even aborting the landing. In various examples, the alert may include an indication that the preselected automatic braking system (ABS) setting is insufficient to achieve the target deceleration rate for the landing aircraft, or may include at least one of an indication to increase thrust reversers, an indication to increase aerodynamic drag, and an indication to increase wheel braking strength of the aircraft. In addition or alternatively, a multiple stage alarm can be utilized. For example, a two-stage alarm can be used to provide a first-level warning, indicating that the aircraft is not meeting the target braking profile but could do so upon corrective action (e.g., increase auto brake, implement manual braking, disable anti-skid brakes, increase flaps, maximum reversers, etc.), and an increased second-level warning indicating that the aircraft cannot meet the target braking without extreme action (or possibly not at all). For example, a yellow indicator (flashing or static) and/or an audible alarm (sound or spoken warning) can be used.

The feedback module 30 may further include features to delay or defeat the alerts provided to the pilot based upon various conditions. In one example, the feedback module 30 may delay alerts during a predetermined rollout time or distance of the aircraft once it has touched down on the ground surface and is traversing along the runway using its landing wheels. Such a rollout delay may provide the system 10 adequate time or distance to enable more accurate readings, may provide the pilot time to deploy the various braking mechanisms, and/or may provide time or distance for the various braking mechanisms to have an effect upon the aircraft. Generally, the aerodynamic drag and thrust reversers provide the majority of the initial deceleration of the aircraft at the beginning of a landing sequence when the aircraft is typically travelling fast, such as above about 50-100 knots, and when the aircraft is slowed to below this speed the majority of the deceleration is then provided by the wheel braking system. Thus, the rollout delay may provide time or distance for the wheel braking system to initially have an impact upon the aircraft's deceleration. In one example, the system 10 can determine when the aircraft has first landed on the ground surface, and may then monitor an amount of time elapsed since the aircraft has first landed on the ground surface. The feedback module 30 may be automatically inhibited from providing an alert to the operator for a predetermined amount of elapsed time. Different time intervals can be used, such as 1 second, 5 seconds, etc., although the time can be measured in milliseconds, seconds, or any other desired unit. Alternatively, once the system 10 determines that the aircraft has first landed on the ground surface, a distance travelled by the aircraft along the ground surface can be monitored. The feedback module 30 may be automatically inhibited from providing an alert to the operator for a predetermined amount of distance. Various rollout distances can be used, such as 5 feet, 10 feet, 20 feet, etc., although the distance can be measured in feet, meters, or any other desired unit.

The feedback module 30 may further include the capability to turn off, either automatically or manually, once the aircraft has slowed below a predetermined speed, or even stopped. For example, once the system 10 determines that the aircraft has first landed on the ground surface, the speed of the aircraft along the ground surface can be monitored. The feedback module 30 may be inhibited, either automatically or manually, from providing an alert to the operator when the speed of the aircraft is below a predetermined value. The predetermined speed may include the taxi speed of the aircraft, or may even include a full stop of the aircraft. However, the system 10 may optionally override and prevent the feedback module 30 from being inhibited if the system 10 determines that there is a continuing risk to the aircraft despite the low speed. For example, the system 10 may utilize the airport database module 20 and/or location database module 22, in conjunction with a geographical location sensor, to determine characteristics of the current runway and the location of the aircraft upon that runway. If the system 10 determines that there is insufficient runway distance remaining based upon the aircraft's current ground speed, and if the aircraft wheel brakes are still being deployed manually and aggressively, then the system 10 may prevent the feedback module 30 alerts from being defeated, and may even issue additional alerts pertaining to the runway distance. Finally, the feedback module 30 can include a mute mode, in which visual alerts are displayed but audible alerts are silent (or vice-versa), or even a complete defeat mode in which data is logged but no alerts are output. The feedback module 30 may further respond to a silence mode, which may be selectively activated by the pilot via the input device, to turn off either or both of the visual or audible alarms, as desired, but possibly leave active a tactile vibrator.

Additionally, the predicted braking force (based on the pilot-selected aircraft "Auto Braking" setting) can be used to calculate the projected stopping distance for the aircraft. The projected stopping distance can be used to see if it is safe to land the aircraft to determine an expectation for controllability of the aircraft during a landing operation, or to warn a pilot when the real-time, measured aircraft deceleration performance is too low to permit a safe landing within the remaining length of the runway, or to advise a following pilot of the distance required to stop in the event of a landing or an aborted takeoff.

In addition to the foregoing, the system can further include various other optional feedback apparatuses, such as where the system is partially or entirely integrated into the aircraft system. In one example, the feedback apparatus can provide tactile feedback. One type of tactile feedback includes providing resistance to a mechanical input, such as the aircraft's steering, braking, or throttle mechanisms, using known techniques. Another type of feedback apparatus includes providing positive force and/or back-force to vehicle controls or mechanical inputs, such as the aircraft's steering, braking, or throttle mechanisms, using known techniques. This force feedback has an effect similar to the application of resistance, except that it pushes back with a force greater than that which was originally applied by the operator, but not more than an operator can apply after receiving the feedback. An additional type of feedback is aircraft control override. This type of feedback is similar to tactile feedback, and specifically to force feedback, except that force is applied to the mechanical inputs with a force too great for the operator to reasonably overcome, or indirectly by providing direct inputs to controls while disabling operator control. Another type of tactile feedback can include a vibrating component in contact with the pilot(s), such as a vibrating computing device, floor or seat covering.

Finally, the system can have various modes of operation, such as three principal modes of operation: a monitoring mode, a learning mode, and an operating mode. In the monitoring mode, the system can be used to acquire data from the sensors for different conditions and store the data in the database or transmit the data for use by aircraft monitoring computers for simulation and analysis. The monitoring mode would allow engineers to determine appropriate limits and formulas for use by the processor in the operating mode. Additionally, the acquired data could be used to fundamentally improve the configuration, operation or SOPs of the aircraft.

In the learning mode, the processor acquires data from the sensors as well as user input to set various operating limits for use in the operating mode. During the learning mode, the engineer performs various tests on the aircraft under different operating conditions and indicates to the processor when maximum safe operating conditions are reached or exceeded. If the target deceleration rates of an automatic braking system are not known or available, such data may be determined by using the learning mode to with experimental aircraft landings on a clean, dry, and highly tractive runway surface. The various target deceleration rates can be determined by conducting multiple aircraft decelerations on the runway with the automatic braking system changed among its various settings. If an aircraft does not have an automatic braking setting, then one or more target deceleration rates can still be determined for the aircraft in the learning mode by similarly conducting multiple aircraft decelerations on the runway using various combinations of settings for the aircraft's deceleration systems, including any of aerodynamic braking options, thrust reverse options, and/or wheel braking options (including brake pressure, time of application, etc.). Acquired data may be stored in a database or lookup table, such as entered into any of the various Databases or Modules described herein that can later be utilized by the system.

In the operating mode, the system acquires and processes data from the sensors related to present operating conditions and determine real-time aircraft braking performance based upon algorithms and/or database information and control the operator feedback apparatus as appropriate, as previously described in the various examples herein.

It is further anticipated that the system can have a memory mode, in which some or all of the information used by the system as describe herein, as well as the actual aircraft performance, is retained in memory for future recall, analysis, and/or offsite transmission (e.g., to a location beyond the apparatus). Preferably, the data retained in memory also includes environmental data, such as a date and time stamp, location data, airport and runway data, weather data, pilot data, aircraft type, etc. The data may be supplemented by ground-based information, such as amount and type of runway contamination, time and location of last runway snow removal, chemical treatment of the runway, runway condition reports, etc. Some or all of this supplemental information may be manually input by the pilot or flight crew. The data retained by the memory mode can be recalled by the pilot on-demand in order to review a landing that has occurred, and/or to inform the pilot's future landing decisions. For example, if the pilot wishes to research a previous landing attempt at a particular runway with similar (or even different) conditions, the pilot can easily recall the data to understand how the aircraft performed during one or more previous landings so that the pilot may either use a similar technique and braking settings, or may make modifications to improve the landing experience. This can be useful for a pilot that lands infrequently at a particular airport. Additionally, the data stored in the memory mode may further be transmitted offsite to another data storage location, such as an offsite server connected to a local network or to the internet. Offsite data transmission can be useful for data backup, as well as for use by commercial or governmental agencies and/or other pilots that may be encountering a similar landing situation. Data retained by the memory mode may be encrypted, and may include an authentication attribute to confirm that the data was, in fact, captured using the system and is not fraudulent information. These aspects can be particularly useful for data that is transmitted to an offsite location and which may be used by other pilots, or commercial or governmental agencies.

The system 10 electronically records, in computer-readable memory, the target deceleration rate for the landing aircraft, at least one calculated real-time deceleration rate of the aircraft, and at least one alert provided to the operator of the aircraft. In one example, the memory mode can operate continuously to record landing data in real time. In another example, the memory mode may operate selectively, such as once the aircraft ground speed is reduced below a predetermined amount (or even at a full stop). The system 10 may determine when the aircraft has first landed on the ground surface, and then may electronically record the landing data after the speed of the aircraft is below a predetermined value.

In addition to the foregoing, additional features may be utilized from other patents assigned to the Applicant, including U.S. Pat. Nos. 6,130,608; 6,725,135; 6,934,611; and 7,617,721, all of which are expressly incorporated herein by reference.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A method of providing alert information, regarding an aircraft wheel braking system, to an operator of an aircraft during an aircraft landing, comprising:
   receiving a manually-entered input from the operator of the aircraft of a target deceleration rate for said landing aircraft, said input being received prior to said aircraft having landed on a ground surface,
   wherein said input is received by an independent electronic device that is in physical connection with said aircraft but does not receive any electronic data communication input from said aircraft;
   electronically collecting, via at least one sensor on the independent electronic device, information relevant to a real-time deceleration rate of said aircraft after said aircraft has landed on said ground surface;
   calculating the real-time deceleration rate of said aircraft;
   comparing said target deceleration rate to the calculated deceleration rate to determine an effectiveness of said aircraft wheel braking system; and
   providing, via the independent electronic device, a visual, audible, or tactile alert to the operator of the aircraft if the effectiveness of said aircraft wheel braking system is different than an anticipated amount.

2. The method of claim 1, wherein the real-time deceleration rate of said aircraft includes a composite value including the deceleration rates attributable to at least two of aerodynamic drag of the aircraft, thrust reversal of the aircraft, and wheel braking of the aircraft.

3. The method of claim 1, wherein the anticipated amount is one of a percentage and a range of the target deceleration rate.

4. The method of claim 1, further comprising the steps of:
   determining when said aircraft has first landed on said ground surface; and
   automatically inhibiting the step of electronically collecting information relevant to the real-time deceleration rate of said aircraft until it is determined that said aircraft has first landed on said ground surface.

5. The method of claim 1, further comprising the steps of:
   determining when said aircraft has first landed on said ground surface;
   monitoring an amount of time elapsed since said aircraft has first landed on said ground surface; and
   automatically inhibiting the step of providing an alert to the operator for a predetermined amount of elapsed time.

6. The method of claim 1, further comprising the steps of:
   determining when said aircraft has first landed on said ground surface;
   monitoring a distance traveled by said aircraft along said ground surface since said aircraft has first landed on said ground surface; and
   automatically inhibiting the step of providing an alert to the operator for a predetermined amount of distance.

7. The method of claim 1, further comprising the steps of:
   determining when said aircraft has first landed on said ground surface;
   monitoring a speed of said aircraft along the ground surface; and
   inhibiting the step of providing an alert to the operator when said speed of said aircraft is below a predetermined value.

8. The method of claim 7, further comprising the steps of:
   electronically recording, in a computer-readable memory, the target deceleration rate for said landing aircraft, at least one calculated real-time deceleration rate of said aircraft, and at least one alert provided to the operator of the aircraft,
   wherein said electronic recording occurs after said speed of said aircraft is below a predetermined value.

9. The method of claim 1, wherein the step of receiving a manually-entered input of a target deceleration rate comprises the steps of:
   receiving a manually-entered input from the operator of the aircraft of an automatic braking system (ABS) setting for said aircraft; and
   determining the target deceleration rate for said aircraft by correlating said manually input automatic braking system (ABS) setting with a predetermined deceleration rate for said aircraft.

10. The method of claim 1, wherein the information relevant to the real-time deceleration rate of said aircraft is collected in situ by said independent electronic device.

11. The method of claim 10, wherein said at least one sensor includes at least one of an accelerometer and geographical location sensor.

12. The method of claim 11, wherein said geographical location sensor comprises a Global Positioning System (GPS) receiver.

13. The method of claim 1, wherein the step of providing an alert to the operator of the aircraft includes an indication that the calculated real-time deceleration rate of said aircraft is less than the target deceleration rate for said landing aircraft.

14. The method of claim 1, wherein the step of providing an alert to the operator of the aircraft includes an indication that a preselected automatic braking system (ABS) setting is insufficient to achieve the target deceleration rate for said landing aircraft.

15. The method of claim 1, wherein the step of providing an alert to the operator of the aircraft includes at least one of an indication to increase thrust reversers, an indication to increase aerodynamic drag, and an indication to increase wheel braking strength of the aircraft.

16. The method of claim 1, wherein said ground surface is a runway.

17. A system for providing alert information, regarding an aircraft wheel braking system, to an operator of an aircraft during an aircraft landing, comprising:
   an independent electronic device that is in physical connection with said aircraft but does not receive any electronic data communication input from said aircraft, the independent electronic device comprising at least one sensor including at least one of an accelerometer and geographical location sensor,
   the independent electronic device further comprising at least one microprocessor and a computer-readable memory device including executable logic that is to be executed by the microprocessor for controlling opera tion of the independent electronic device, the executable logic comprising:

a data collection module configured to receive a manually-entered input from the operator of the aircraft of a target deceleration rate for said landing aircraft prior to said aircraft having landed on a ground surface, and to electronically collect, via the at least one sensor on the independent electronic device, information relevant to a real-time deceleration rate of said aircraft after said aircraft has landed on said ground surface;

an analysis module in signal communication with the data collection module configured to calculate the real-time deceleration rate of said aircraft based upon said collected information, and to compare said target deceleration rate to the calculated deceleration rate to determine an effectiveness of said aircraft wheel braking system; and a feedback module in signal communication with the analysis module that is configured to output, via the independent electronic device, a visual, audible, or tactile alert to the operator of the aircraft if the effectiveness of said aircraft wheel braking system is different than an anticipated amount.

18. The system of claim 17, wherein the independent electronic device comprises an input device configured to receive the manually-entered input from the operator of said aircraft that is usable by the data collection module, and an output device configured to output the visual or audible alert to the operator of the aircraft provided by the feedback module.

19. The system of claim 18, wherein the independent electronic device comprises a touchscreen device comprising both a visual display device and a touch-sensitive input device, such that the touchscreen device comprises both of the input device and the output device.

20. The system of claim 17, wherein the at least one sensor is in signal communication with the data collection module.

21. The system of claim 17, wherein the feedback module is in signal communication with an on-board aircraft safety system, and wherein the feedback module is configured to send electronic data communication output to said on-board aircraft safety system to be used as an input for affecting operation of said aircraft during said aircraft landing.

22. The system of claim 21, wherein the feedback module is configured to send electronic data communication output to the on-board aircraft safety system for changing a setting of an automatic braking system (ABS) of said aircraft during said aircraft landing.

23. The system of claim 21, wherein the feedback module is configured to send electronic data communication output to the on-board aircraft safety system for disabling the automatic braking system (ABS) of said aircraft during said aircraft landing.

* * * * *